(12) United States Patent
Yoshida et al.

(10) Patent No.: US 8,086,973 B2
(45) Date of Patent: Dec. 27, 2011

(54) PATTERN MANAGEMENT METHOD AND PATTERN MANAGEMENT PROGRAM

(75) Inventors: Kenji Yoshida, Yokohama (JP); Soichi Inoue, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 377 days.

(21) Appl. No.: 11/958,465

(22) Filed: Dec. 18, 2007

(65) Prior Publication Data

US 2008/0216046 A1     Sep. 4, 2008

(30) Foreign Application Priority Data

Dec. 21, 2006   (JP) ................................. 2006-344804

(51) Int. Cl.
*G06F 17/50* (2006.01)
(52) U.S. Cl. ................ 716/51; 716/50; 716/52; 716/53; 716/54; 716/55; 430/5; 430/30
(58) Field of Classification Search .............. 716/19–21, 716/50–55; 430/5, 30
See application file for complete search history.

(56) References Cited

U.S. PATENT DOCUMENTS

| 5,627,625 | A  | * | 5/1997 | Ogawa ............................ 355/53 |
| 6,727,028 | B2 | * | 4/2004 | Kotani et al. ..................... 430/5 |
| 6,952,818 | B2 | * | 10/2005 | Ikeuchi ......................... 430/311 |
| 7,252,910 | B2 | * | 8/2007 | Hasegawa et al. ................ 430/5 |
| 7,601,471 | B2 | * | 10/2009 | Osawa et al. ................... 430/30 |

FOREIGN PATENT DOCUMENTS

| JP | 2000-260706 | 9/2000 |
| JP | 2004-184633 | 7/2004 |

* cited by examiner

*Primary Examiner* — Nghia Doan
(74) *Attorney, Agent, or Firm* — Finnegan, Henderson, Farabow, Garrett & Dunner, L.L.P.

(57) ABSTRACT

A pattern management method includes extracting patterns having process margins equal to or below a predetermined value from a chip layout of an integrated circuit, screening a plurality of types of representative patterns from the extracted pattern, extracting patterns closest to the most outer periphery of the chip from the representative patterns, and representatively managing the extracted patterns which is closest to the most outer periphery of the chip.

16 Claims, 6 Drawing Sheets

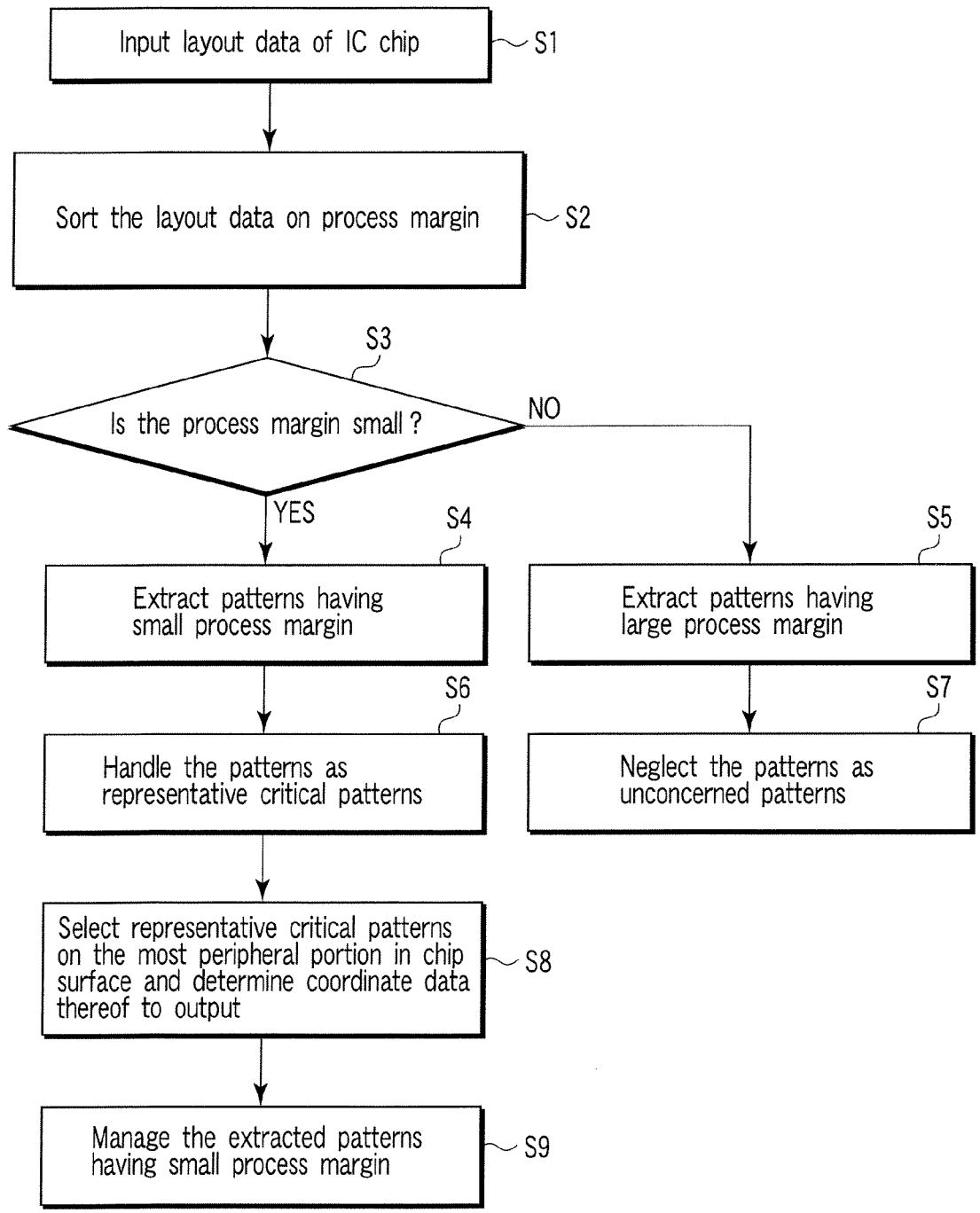
F I G. 1

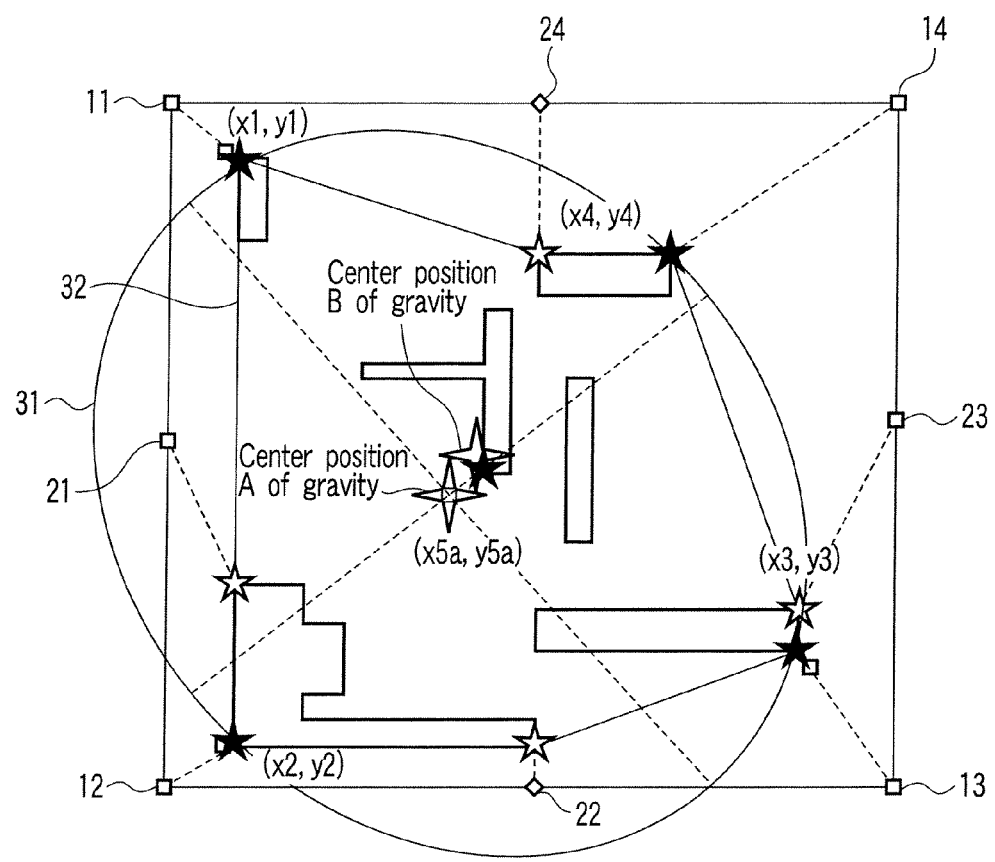
F I G. 6
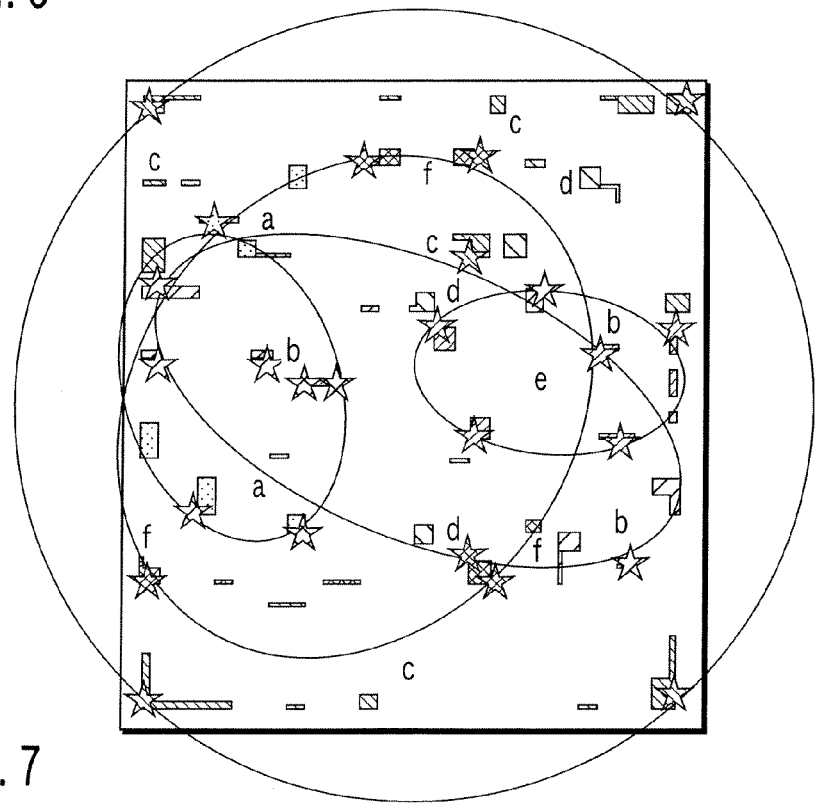
F I G. 7

PATTERN MANAGEMENT METHOD AND PATTERN MANAGEMENT PROGRAM

CROSS-REFERENCE TO RELATED APPLICATIONS

This application is based upon and claims the benefit of priority from prior Japanese Patent Application No. 2006-344804, filed Dec. 21, 2006, the entire contents of which are incorporated herein by reference.

BACKGROUND OF THE INVENTION

1. Field of the Invention

The present invention relates to a pattern management method of extracting and managing a critical pattern that is likely to lead to a defect from a chip layout of an integrated circuit.

Specifically, in a photolithography step and a processing step, this method is used for a design, an improvement in a systematic error of optical proximity correction (OPC), enhancement of a simulation technology and of a production yield of a production line, and stabilization of a process margin. In particular, it is used to develop a mask technology, improve the simulation technology, and manage process manufacture in the photolithography step.

2. Description of the Related Art

In mask development in a photolithography step, simulation or check of a design rule of OPC are conventionally performed in accordance with each generation to correct and optimize a critical pattern which becomes a hotpot. Specifically, a mask finished according to a design is created based on OPC simulation, subjected to a trial production in a plant side (on a production line), and subjected to a mass production if it can meet expectations. However, taking a measure against a defective pattern position on an initial stage and developing each mask strictly based on the design rule are becoming difficult when the design rule tightens (see, e.g., JP-A 2004-184633 [KOKAI]).

In regard to a pattern in a chip surface which has insufficiently process margin and is likely to fluctuate in particular, a degree of an influence thereof cannot be estimated, and an electrical defect (an open circuit or a short circuit) occurs. In this case, since a production yield is not stabilized until mass production is started and process conditions are determined, many defective products are produced, which leads to a waste of time, that is, long turn-around time (TAT).

Further, since a lot is managed with a small process margin, a fluctuation in the process provokes a low production yield because of an influence of an unknown critical position. In order to extract such a pattern having insufficient process margin at such a critical position, running a production yield confirmation lot is indispensable to find the position with the low production yield and analyze the defect. Therefore, a long time and many engineers are required for optimization of the process condition.

As explained above, according to the conventional technology, a systematic critical position, which cannot be detected by checking based on a design rule, is generated in regard to a newly introduced product, a product based on a strict design rule, and an existing product having no stabilized production yield, and this becomes a factor of the low production yield. Furthermore, there is a problem of requiring big chunks of time and cost until a critical position which becomes a hotpot affecting a production yield is detected. Moreover, there is another problem that a critical position cannot be specified because of an issue of a detection sensitivity of an inspection device due to an influence of a process, even though the critical pattern is extracted on a wafer subjected to pattern formation based on photolithography, and each product cannot be stably supplied.

Additionally, in mask development in the photolithography step, specifying a critical position in a pattern is difficult, resulting in a reduction in a production yield and a process margin.

Therefore, it is desired that realization of a pattern management method which can readily extract a critical pattern likely leading to a defect from a chip layout of an integrated circuit, and can contribute to improving a production yield and stabilize a process margin.

BRIEF SUMMARY OF THE INVENTION

According to a first aspect of the invention, there is provided a pattern management method, which includes:

extracting patterns having process margins equal to or below a predetermined value from a chip layout of an integrated circuit;

screening a plurality of types of representative patterns from the extracted pattern;

extracting patterns closest to the most outer periphery of the chip from the representative patterns; and representatively managing the extracted patterns which is closest to the most outer periphery of the chip.

According to a second aspect of the invention, there is provided a pattern management method, which includes:

extracting patterns each having one or more side peaks in light condensing during exposure from a chip layout of an integrated circuit;

extracting patterns closest to the most outer periphery of the chip from the extracted patterns having one or more side peaks; and managing the extracted patterns which is closest to the most outer periphery of the chip.

According to a third aspect of the invention, there is provided a computer program product configured to store pattern management program instructions for execution on a computer system enabling the computer system to perform:

extracting patterns having process margins equal to or below a predetermined value, or patterns each having one or more side peaks in light condensing during exposure, from a chip layout of an integrated circuit;

when the patterns having process margins equal to or below the predetermined value is extracted, screening a plurality of types of representative patterns from the extracted patterns; and extracting patterns closest to the most outer periphery of the chip from the representative patterns or the extracted patterns having one or more side peaks.

BRIEF DESCRIPTION OF THE SEVERAL VIEW OF THE DRAWING

FIG. 1 is a flowchart for explaining a pattern management method according to a first embodiment;

FIG. 6 is a view showing how to select representative patterns (xn, ym) which are closest to the most outer periphery from respective four corners of the representative patterns having small process margins in a chip;

FIG. 7 is a view schematically showing a method of selecting representative patterns 1 to 5 as critical patterns;

DETAILED DESCRIPTION OF THE INVENTION

Embodiments according to the present invention will now be explained hereinafter with reference to the accompanying drawings.

First Embodiment

FIG. 1 is a flowchart for explaining a pattern management method according to a first embodiment of the present invention.

Figure 2:
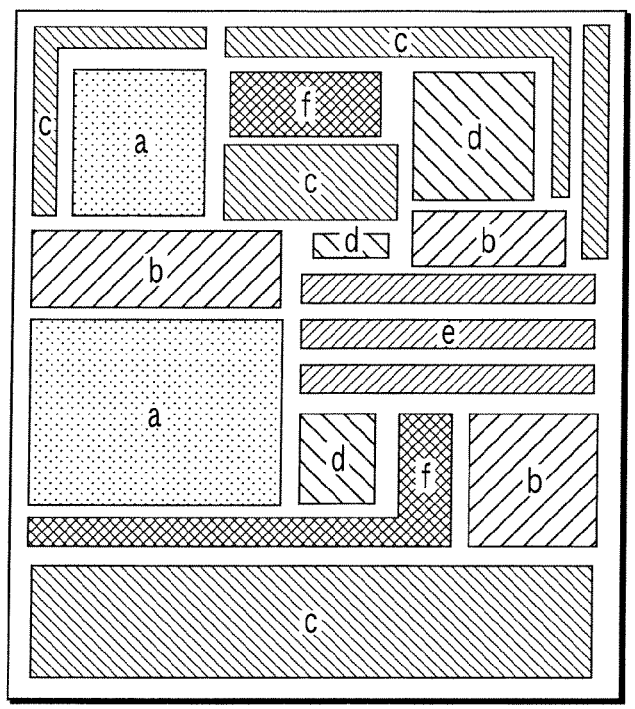
FIG. 2 is a view showing an example of a layout of an integrated circuit chip.

First, a layout of an integrated circuit chip is input (step S1). FIG. 2 shows an example of the layout of the integrated circuit chip. Here, reference character a in FIG. 2 denotes a primitive cell (a random logic pattern); b, an SRAM pattern; c, a DRAM pattern; d, an analog pattern; e, an IO cell; and f, a functional IP block (MPU).

Figure 3:
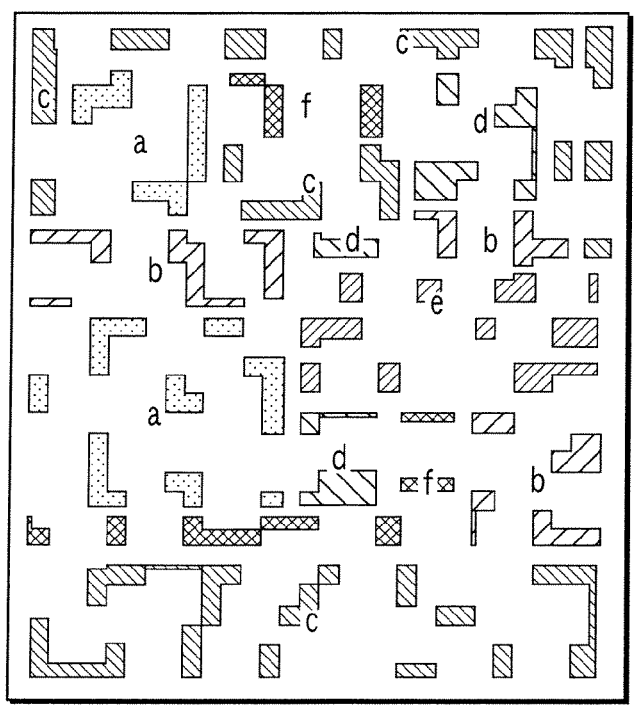
FIG. 3 is a view showing a layout in which patterns having small process margins are extracted as critical patterns.

Subsequently, the input layout is sorted into patterns having process margins smaller than a predetermined value and patterns having process margins larger than the same (steps S2 and S3). Further, as shown in FIG. 3, the patterns having the small process margins are extracted (step S4), and the patterns having the large process margins are also extracted (step S5).

Figure 4:
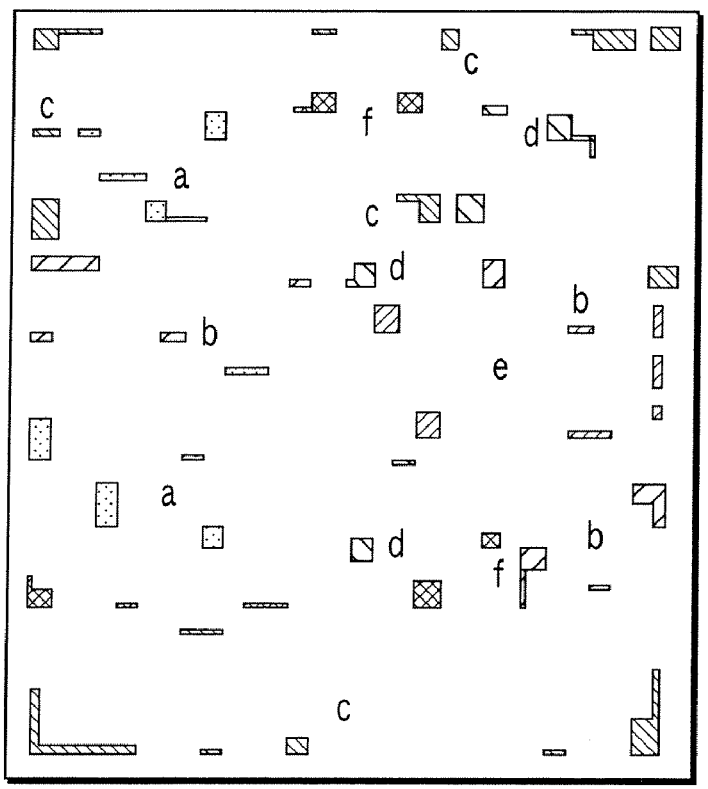
FIG. 4 is a view showing a layout in which critical patterns are screened as representative critical patterns.
Figure 5:
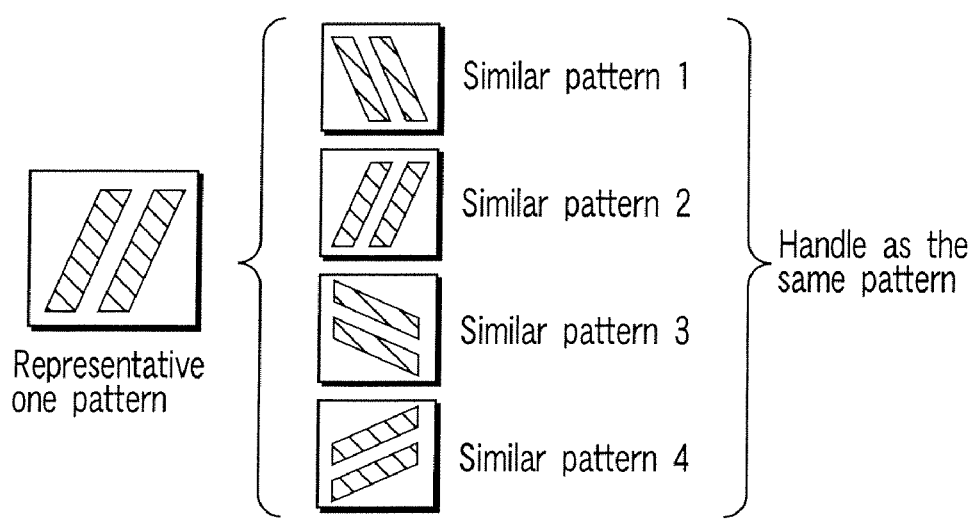
FIG. 5 is a view showing a layout in which similar patterns are screened as the same patterns by sorting the same representative patterns from critical patterns.

The patterns having the small process margins extracted in step S4 are screened as representative patterns as shown in FIG. 4 (step S6). Specifically, as shown in FIG. 5, representative patterns having the same size/shape (inversion/mirror) are screened from the extracted patterns, and similar patterns are sorted as the same pattern. On the other hand, the patterns having the large process margins extracted in step S5 are neglected as unconcerned patterns (step S7).

That is, in steps S3, S4, S5, and S7, neglecting processing is performed if the process margins of the patterns a, b, c, d, e, and f are larger than a specification, and extracting processing is carried out if they are smaller than the specification.

It is to be noted that the patterns having the small process margins are patterns each having a lithography margin and a processing margin smaller than those of other patterns. As factors of the processing margin, there are a depth of focus (DOF), a dose margin, a focus margin, a size variation through etching, resist tailing-off due to a film material, a resolution limit, optical illumination conditions (NA, $\sigma$, $\epsilon$), and one-dimensional and two-dimensional patterns (a butting pattern, an enclosed pattern, a back-to-back pattern, an island pattern, a narrow-space pattern, a shortening pattern, a dense pattern such as a line-and-space pattern, a primitive cell pattern [a random logic pattern], an SRAM pattern, a DRAM pattern, an analog pattern, an IO cell pattern, a functional IP block pattern [MPU]).

Then, in regard to the representative patterns screened in step S6, representative critical positions close to the most outer periphery in a chip surface are sampled, and coordinate data thereof are set and output (step S8).

Specifically, as shown in FIG. 6, representative patterns (xn, yn) closest to the most outer periphery from respective four corners of the representative patterns with the in-chip process margins smaller than a predetermined value are selected. Here, each filled-in star in FIG. 6 indicates a representative pattern position obtained from chip corner positions 11, 12, 13, and 14, and each open star indicates a representative pattern obtained from central portions 21, 22, 23, and 24 on four sides of the chip. Subsequently, a single elliptical critical area 31 or polygonal critical point area 32 which is adjacent to the most outer periphery of the respective selected patterns is determined. Then, a central point serving as a center of gravity (a center position A or B of gravity) is obtained from the single critical area 31 or 32. Subsequently, a pattern which is closest to the center position A or B of gravity of the single critical area 31 or 32 is selected as a central pattern. Thereafter, representative patterns 1 to 5 are selected as critical patterns, and coordinate data thereof is obtained.

Furthermore, as shown in FIG. 7, critical patterns are selected in accordance with the respective representative patterns a, b, c, d, and e. That is, coordinate data of (x1a, y1a) to (x5a, y5a), (x1b, y1b) to (x5b, y5b), (x1c, y1c) to (x5c, y5c), and (x1d, y1d) to (x5d, y5d) is obtained.

Subsequently, the extracted critical patterns having no process margin are managed (step S8). Specifically, measurement of dimensions on a mask and a wafer, process simulation, pattern correction, and others are carried out at a position corresponding to each critical pattern. Specifically, process management of the mask, the wafer, and a difference between the mask and the wafer (measurement [inter-lot, inter-wafer, inter-shot, in-shot, or inter-pattern] control, and judgment of a dimension/shape) is carried out.

More specifically, the following processing is effected, for example.

(1) SEM dimension measurement at a critical position on the mask is performed, and advanced process control (APC) and correction are carried out with respect to the measured value.

(2) One-dimensional and two-dimensional shapes of a critical position on the mask are measured, and SEM images are output.

(3) Simulation and OPC correction of the one-dimensional and two-dimensional shapes of a critical position on the mask are performed.

(4) An SEM dimension of a hotpot position on the wafer is measured, and APC and correction are performed.

(5) One-dimensional and two-dimensional shapes of a hotpot position on the wafer are measured, and SEM images are output.

(6) Simulation and OPC correction of one-dimensional and two-dimensional shapes of a hotpot position on the wafer are carried out.

(7) In regard to a processing unit of a coating/developing device on the wafer, inter-unit correction and in-unit correction are performed.

(8) A $\Delta$ (wafer-mask) dimension/shape difference is measured to be subjected to APC and correction.

(9) Simulation and OPC correction are performed with respect to a Δ (wafer-mask) two-dimensional shape difference.

(10) In regard to Δ (wafer-mask), a focus difference (between exposure devices, between patterns, in a chip, between chips, between wafers, and between lots) is measured to be subjected to APC and correction.

(11) In regard to Δ (wafer-mask), a dose difference (between exposure devices, between patterns, in a chip, between chips, between wafers, and between lots) is measured to be subjected to APC and correction.

(12) In regard to Δ (wafer-mask), a two-dimensional shape difference (between exposure devices, between patterns, in a chip, between chips, between wafers, and between lots) is measured to be subjected to APC control and correction.

(13) In regard to Δ (wafer-mask), a lens aberration of the exposure device is measured to be subjected to APC control and correction.

(14) Specification management and optimization are carried out from a dimension measurement result and a simulation result of each hotpot position on the wafer.

(15) Critical position management and critical pattern correction are performed from the dimension measurement result and the simulation result of each hotpot position on the wafer.

(16) Each hotpot position on the wafer is collated with design data to measure a difference and judge validity of the specification.

(18) Each hotpot position on the wafer is collated with the design data to simulate a difference and perform mask OPC correction.

(19) In regard to one-dimensional pattern dimension data and shape data (the design data) of Δ (wafer-mask), lot QC and device QC management is effected to judge a result.

Here, the critical pattern means a pattern which has a small process margin and is likely to lead to a defect, and various kinds of managements (process management, dimension control, and others) are performed with respect to this critical pattern rather than all patterns. If no defect occurs in the critical pattern, it can be considered that all patterns have no defect. Immeasurable time and cost are required to perform various kinds of management with respect to all patterns, but effecting various kinds of managements to the critical pattern alone can greatly reduce the time and the cost.

That is, in management of patterns in integrated circuit layout manufacturing steps, extracting difficult patterns in particular at a lithography step for patterns having small process margins enables judging all doses, focuses, margins, and others within a shot, and strict pattern management and process control can be carried out, thereby improving a systematic dimension accuracy and stabilizing a production yield.

As explained above, according to the present embodiment, a critical pattern which is likely to lead to a defect can be readily extracted from the chip layout of the integrated circuit. Further, managing this critical pattern can contribute to improving the production yield and stabilizing the process margin.

Second Embodiment

Figure 8:
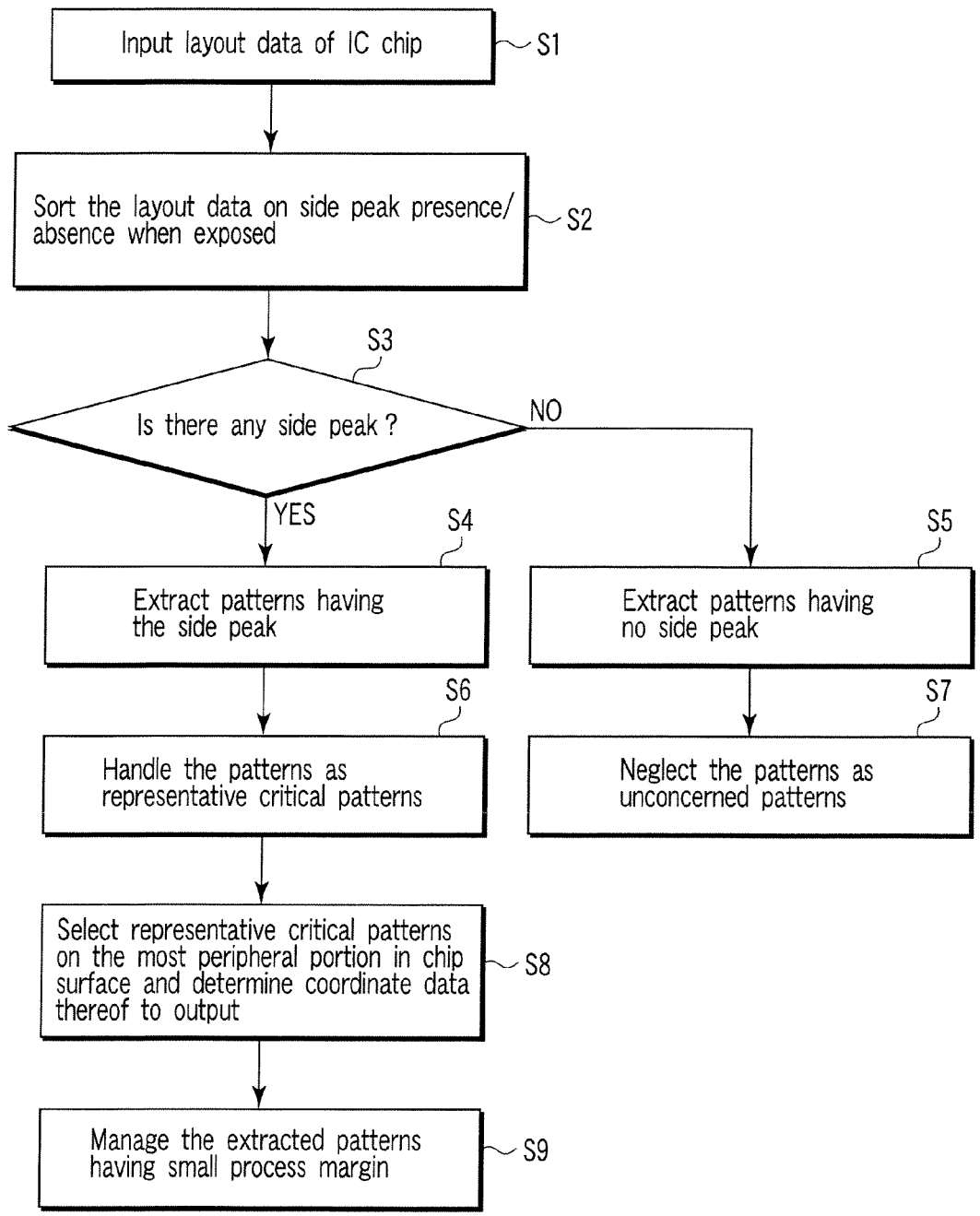
FIG. 8 is a flowchart for explaining a pattern management method according to a second embodiment.

FIG. 8 is a flowchart for explaining a pattern management method according to a second embodiment of the present invention.

Figure 9:
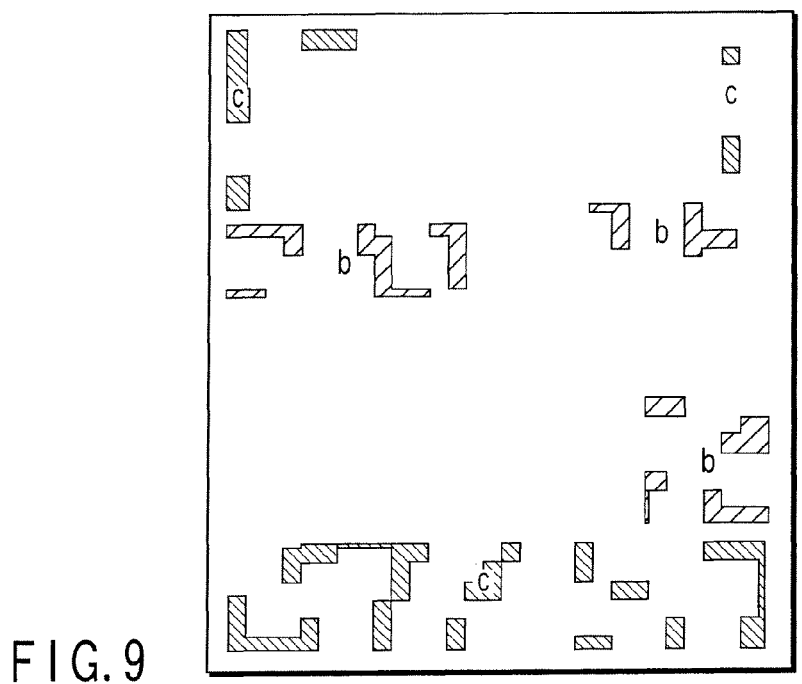
FIG. 9 is a view showing a layout in which patterns having side peak (secondary peak) light condensing are extracted.
Figure 10:
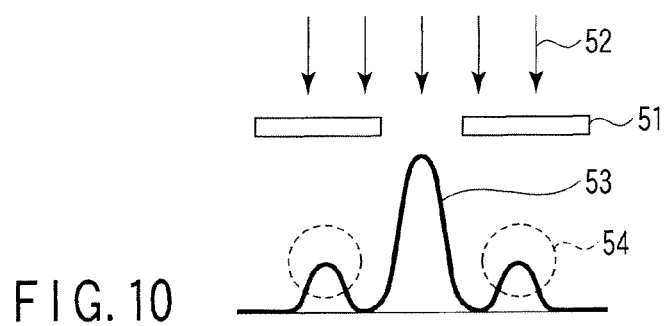
FIG. 10 is a view showing an example of secondary peaks produced on sides of a primary peak.

This embodiment is different from the above-explained first embodiment in sorting a layout in steps S2 to S5. That is, in this embodiment, in steps S2 and S3, attention is paid to patterns having side (secondary) peaks during exposure, and these patterns are sorted into patterns having one or more side peak light condensing portions and patterns having no light condensing. Further, as shown in FIG. 9, patterns having side peak (secondary peak) light condensing are extracted in step S4, and patterns having no side peak are extracted in step S5.

Figures 11A, 11B:
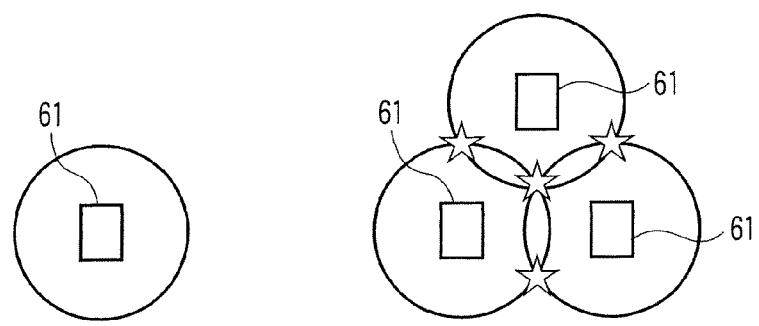
FIG. 11A shows an exposure pattern of an isolated contact hole.
FIG. 11B is a view schematically showing how side peaks are produced in regard to contact holes adjacent to each others.

Here, the side peak is a secondary peak 54 produced on each of sides of a primary peak 53 when exposure light 52 is applied through an opening portion of a mask 51. As shown in FIG. 11A, when a contact hole pattern 61 is isolated, the side peak is not subjected to light condensing. However, as shown in FIG. 11B, when the contact hole patterns 61 are adjacent to each other, the side peaks are subjected to light condensing. A filled-in star represents a light condensing number 1 and an open star represents a light condensing number 2 in the drawing.

That is, in steps S3, S4, S5, and S7, neglecting processing is carried out when there is no side (secondary) peak light condensing, and extraction processing is performed when there is side (secondary) peak light condensing.

Subsequently, like the first embodiment, critical positions on the most outer periphery in a chip surface are sampled, and coordinate data thereof is set and output (step S6). Here, like the first embodiment, patterns having side peak light condensing extracted in step S3 may be screened as representative critical patterns as shown in FIG. 4 before S8.

Then, the extracted patterns having side peaks are managed (step S8). Specific processing is the same as that in the first embodiment.

As explained above, according to this embodiment, critical patterns which are likely to lead to defects of contact hole patterns can be readily extracted from a chip layout of an integrated circuit. Furthermore, managing the critical patterns can contribute to improving a production yield and stabilizing a process margin.

(Modification)

It is to be noted that the present invention is not limited to the respective foregoing embodiments. Although patterns having small process margins are extracted in the first embodiment and patterns having side peak light condensing are extracted in the second embodiment, both the types of extraction may be performed. Moreover, although a total of five patterns, i.e., four patterns which are on or closest to the most outer periphery of a chip and a pattern at a central part of the same are extracted as critical patterns in the first embodiment, the four patterns which are on or closest to the most outer periphery alone may be extracted as critical patterns.

Additionally, the technique explained in the foregoing embodiments can be written in a recording medium, e.g., a magnetic disk (a floppy (registered mark) disk, a hard disk, and others), an optical disk (a CD-ROM, a DVD, and others), or a semiconductor memory or transferred through a communication medium as a program which can be executed by a computer to be applied to various kinds of devices. As the computer which realizes the present invention, one reads a program recorded in a recording medium and executes the above-explained processing when its operation is controlled by this program can suffice.

According to the present embodiments, critical patterns can be readily extracted from a chip layout of an integrated circuit, strict pattern management and process control are enabled, a production yield can be improved, and a process margin can be stabilized.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A pattern management method comprising:
extracting patterns having process margins equal to or below a predetermined value from a chip layout of an integrated circuit by using a computer;
screening a plurality of types of representative patterns from the extracted pattern to identify critical patterns through the computer;
extracting the critical patterns closest to the most outer periphery of the chip from the representative patterns through the computer, wherein the critical patterns have process margins equal to or below the predetermined value; and
representatively managing the extracted critical patterns which are closest to the most outer periphery of the chip including performing measurement of dimensions on a mask and a wafer at positions corresponding to the extracted critical patterns closest to the most outer periphery of the chip.

2. The method according to claim 1, wherein said screening a plurality of types of representative patterns includes screening similar patterns including reverse and mirror patterns as the same pattern with respect to size and shape from the plurality of types of representative patterns.

3. The method according to claim 1, wherein said extracting the critical patterns closest to the most outer periphery of the chip includes extracting respective patterns closest to four corner portions of the chip.

4. The method according to claim 1, wherein said extracting the critical patterns closest to the most outer periphery of the chip includes extracting respective patterns closest to centers of four sides of the chip.

5. The method according to claim 1, further comprising extracting a pattern at a central portion of the chip as one of the extracted critical patterns for managing.

6. The method according to claim 1, wherein said managing the extracted critical patterns closest to the most outer periphery of the chip includes performing process simulation and condition correction at the positions corresponding to the extracted critical patterns closest to the most outer periphery of the chip.

7. A pattern management method comprising:
extracting patterns each having one or more side peaks in light condensing during exposure from a chip layout of an integrated circuit by using a computer;
screening a plurality of representative patterns from the extracted patterns to identify critical patterns through the computer;
extracting the critical patterns closest to the most outer periphery of the chip from the extracted patterns having one or more side peaks through the computer, wherein the critical patterns have one or more side peaks in light condensing during exposure; and
managing the extracted critical patterns which are closest to the most outer periphery of the chip including performing measurement of dimensions on a mask and a wafer at positions corresponding to the extracted patterns closest to the most outer periphery of the chip.

8. The method according to claim 7, wherein said extracting the critical patterns closest to the most outer periphery of the chip includes extracting respective patterns closest to four corner portions of the chip.

9. The method according to claim 7, wherein said extracting the critical patterns closest to the most outer periphery of the chip includes extracting respective patterns closest to centers of four sides of the chip.

10. The method according to claim 7, further comprising extracting a pattern at a central portion of the chip as one of the extracted critical patterns for managing.

11. The method according to claim 7, wherein said managing the extracted critical patterns closest to the most outer periphery of the chip includes performing simulation and correction at the positions corresponding to the extracted critical patterns closest to the most outer periphery of the chip.

12. A computer program product configured to store pattern management program instructions for execution on a computer system enabling the computer system to perform:
extracting patterns having process margins equal to or below a predetermined value from a chip layout of an integrated circuit;
when the patterns having process margins equal to or below the predetermined value are extracted, screening a plurality of types of representative patterns from the extracted patterns to identify critical patterns;
extracting the critical patterns closest to the most outer periphery of the chip from the representative patterns, wherein the critical patterns have process margins equal to or below the predetermined value; and
representatively managing the extracted critical patterns which are closest to the most outer periphery of the chip including performing measurement of dimensions on a mask and a wafer at positions corresponding to the extracted critical patterns closest to the most outer periphery of the chip.

13. The computer program product according to claim 12, wherein said screening a plurality of types of representative patterns includes screening similar patterns including reverse and mirror patterns as the same pattern with respect to size and shape from the plurality of types of representative patterns.

14. The computer program product according to claim 12, wherein said extracting the critical patterns closest to the most outer periphery of the chip includes extracting respective patterns closest to four corner portions of the chip.

15. The computer program product according to claim 12, wherein said extracting the critical patterns closest to the most outer periphery of the chip includes extracting respective patterns closest to centers of four sides of the chip.

16. The computer program product according to claim 12, further comprising extracting a pattern at a central portion of the chip as one of the extracted critical patterns for managing.

* * * * *